March 10, 1953 — M. J. KERMER — 2,631,103
DEAERATING AND DEOILING CITRUS JUICES
Filed April 5, 1945
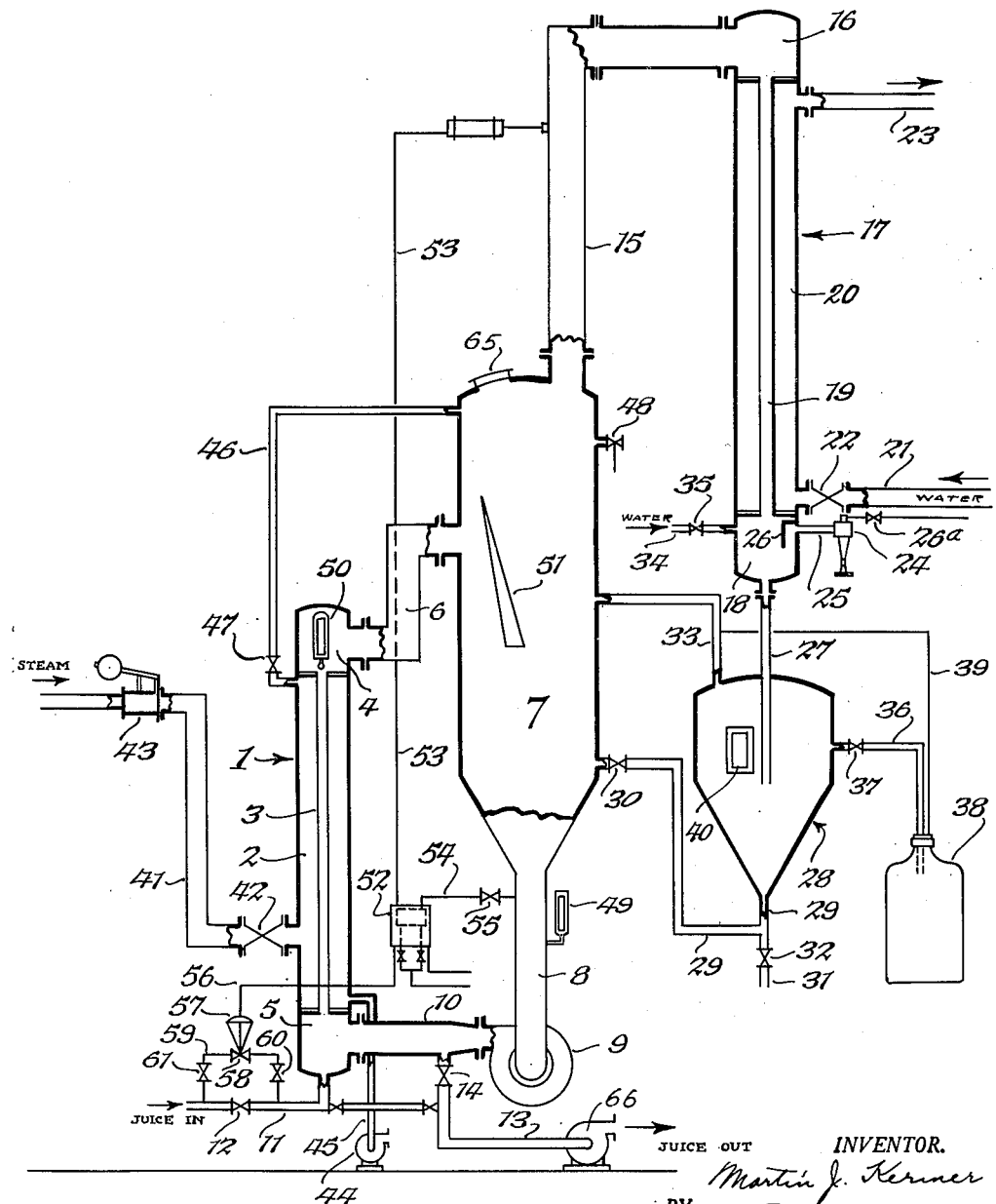
INVENTOR.
Martin J. Kermer
BY Parker, Prochnow & Farmer
Attorneys.

Patented Mar. 10, 1953

2,631,103

UNITED STATES PATENT OFFICE 2,631,103

DEAERATING AND DEOILING CITRUS JUICES

Martin J. Kermer, Buffalo, N. Y., assignor, by mesne assignments, to Blaw-Knox Company, Pittsburgh, Pa., a corporation of Delaware Application April 5, 1945, Serial No. 586,801

5 Claims. (Cl. 99—105)

This invention relates to a method and apparatus for removing gases and oils from fruit juices and the like, such as citrus fruit juices. In the case of citrus fruit juices, air or other gases and oil from the peel are likely to get into the juice during the pressing operation that expresses the juice, and it has been found desirable to remove these gases, such as air, and the oils from these juices. Various attempts have heretofore been made to remove such air or gases and oils, so that the juices when stored or canned, will keep better and retain their natural flavor and taste for a longer time and not acquire undesired tastes. Prior removal attempts, however, have not been entirely satisfactory for various reasons.

An object of this invention is to provide an improved method of removing oils and gases from liquids, such as citrus fruit juices, with which a maximum amount of the oil and gas may be removed with substantially no loss of either citric acid or ascorbic acid, and without injury to the vitamin content and flavor of the juices; with which the taste of the juices will not be objectionably or substantially altered and the keeping quality of the juice will be increased greatly; which may be operated continuously for relatively long periods of time; with which the amount of juice discharged may be approximately the same as the quantity of juice which is treated, except for the loss of gases and removed oil; which will be relatively simple and rapid, require a minimum of apparatus, and which will produce liquids or juices containing a greatly reduced amount of gas and oil at a minimum expense for treatment.

Another object of the invention is to provide an improved apparatus for carrying out the improved method; which may be operated continuously for any desired length of time at a minimum of cost of operation; with which danger of scorching, burning or other damaging of the liquid will be prevented; which will be relatively compact and efficient, and require a minimum of operating attention; which will give a maximum output of treated juices or liquids; with which oil and gases will be removed with a minimum of change in the treated juices except for the removed gases and oils; with which the operation may be stopped at a moment's notice without overheating of the juices; with which the treated juices discharged will be substantially the same in composition as the juices before treatment, except for the removal of gases and the oils; which will be relatively simple, compact and inexpensive, and which will require a minimum of operating attention after operation has been fully started.

Other objects and advantages will be apparent from the following description of one embodiment of the invention, and the novel features will be particularly pointed out hereinafter in connection with the appended claims.

In the accompanying drawing is illustrated, diagrammatically, as a flow diagram, apparatus constructed in accordance with this invention.

In the illustrated embodiment of the invention, all of the apparatus which comes in contact with the fruit juices, vapors and condensates is preferably made of stainless steel or other material which is unaffected by the juices, vapors or condensates. The apparatus includes an evaporator with a vertical steam chest 1 having a steam chamber 2 through which pass a plurality of tubes 3 in a vertical direction, and the tubes 3 are connected at the top with a header 4, and at the bottom with another header 5. The header 4 has an outlet pipe 6 which opens into a flash or separator chamber 7 intermediate of its height. The bottom of the flash chamber 7 opens into a pipe 8 leading to the intake port or side of a circulating pump 9, and the outlet port of the pump 9 is connected by a pipe 10 to the bottom header 5. The pump 9 thus serves to forcibly circulate a liquid through a closed loop conduit in which the flash chamber 7 is in series, and in which the liquid rises vertically through tubes 3 in the steam chest 1. A pipe 11, having a control valve 12 therein is connected to the header 5 so as to deliver fresh juices or liquids to be treated into the header 5 to mix with the juices already forming the circulating stream, and with the mixture passing upwardly through the tubes 3. An outlet pipe 13, controlled by a valve 14, is connected to the pipe 10 so that the portion of the juices or liquids removed from the circulating stream will be removed from the stream leaving the flash chamber before fresh liquid is added thereto.

The flash chamber or separator 7 is provided at its top portion with an outlet vent or pipe 15 leading to a header 16 at the top of a surface condenser 17. This condenser has a lower header 18 which is connected by a plurality of pipes 19 with the upper header 16. The pipes 19 pass through a chamber 20 through which a cooling medium, such as water, is circulated. The cooling water is delivered to the lower end of the chamber 20 through a pipe 21 controlled by a valve 22, which may be adjusted to vary the extent of the vacuum that is maintained in the lower header 18, and is discharged from the upper end of chamber 20 by a pipe 23. A vacuum creating device 24 is connected by pipe 25 to the lower header 18, and a shield 26 extends along the front, top and sides of the opening into the header from the pipe 25. This vacuum creating device may be of any suitable type such as an ejector which creates a partial vacuum in the lower header 18 and removes air and other uncondensed gases that pass through tubes 19 into the header 18. This ejector may be operated by a steam valve 26a. This partial vacuum is communicated through the pipes 19 to the upper header 16, and through it to the pipe 15 and the flash chamber 7.

A drain pipe 27 connects the bottom of the header 18 to an oil separator 28 of any suitable construction. This separator has a somewhat conical bottom opening into a pipe 29 which rises to a desired level midway of the height of the separator 28, and then is connected through a valve 30 to the flash chamber 7 at or above the maximum liquid level therein. A drain pipe 31 controlled by a valve 32 is connected to the lower part of the pipe 29 by which part or all of the liquid in the separator 28 may be drained, such as at the end of an operation when the apparatus is to be cleaned. The upper part of the chamber of the separator 28 is connected by a vent pipe 33 to the upper part of the flash chamber separator 7, and a water supply pipe 34 is connected through a valve 35 to the lower header 18 of the condenser so that at the start of an operation, the chamber of the separator 28 may be filled to a desired level with water, as will be explained herein later.

Just above the liquid level in the chamber of the separator 28, as determined by the outlet of pipe 29, is a pipe 36 which is controlled by a valve 37, and this pipe 36 opens into a jug or reservoir 38 where the oil is collected. A vent pipe 39 connects the top of the jug or reservoir 38 with the pipe 33, so as to balance the atmospheric pressures between the separator 28 and the reservoir 38. The pipes 36 and 39 are sealed in the opening of the reservoir 38, because there will be a partial vacuum in the upper part of the reservoir 28 and in the pipe 33. A window 40 is disposed in the side wall of the separator 28 at about the same level as the opening into the pipe 36 from the separator 28, for a purpose which will be explained later.

Steam is supplied to the chamber 2 of the steam chest 1 through a pipe 41 controlled by a valve 42, and the pipe 41, may, if desired, have a pressure reducing valve 43 in series therein, by means of which steam at a substantial pressure such as from 75 to 100 lbs., may be reduced in pressure for introduction into the steam chest 1. A condensate pump 44 is connected at its intake port to a pipe 45 which opens into the lower end of the chamber 2 of the steam chest 1, so as to remove condensed steam. The upper end of the chamber 2 of the chest 1 is connected through a pipe 46 controlled by a valve 47 to the upper end of the separator 7 so that air collecting in the top of the chamber 2 can escape into the separator chamber 7 and be carried off through the outlet 15. The chamber 7 may also have an air relief valve 48 connected to its upper part as usual in this type of evaporator.

A thermometer 49 having its thermal element in the passage of pipe 8 serves to indicate the temperature of the liquid leaving the chamber 7, and another thermometer 50 having its thermal element in the upper header 4, indicates the temperature of the liquid leaving the steam chest 1 and entering the flash chamber 7. Means is also preferably provided in the flash chamber 7 for converting the entering stream of juices into a thin film or spray so as to expose a maximum surface area of the stream to the atmosphere of the flash chamber. In this particular example the stream is directed against a plate 51 which spreads the liquid into a thin film. By increasing the exposed area of the stream as much as possible as it enters the flash chamber, the release of water vapor, air, gases and oil from the liquid stream will be facilitated. These vapors, so released, are carried off through the outlet 15 to the condenser 17.

The liquid level in the chamber 7 should be maintained fairly constant, and a suitable automatic level regulator 52 is preferably utilized therewith. Such regulators are available in the open market, one suitable type being marketed by Taylor Instrument Co. of Rochester, N. Y. In the illustrated embodiment of the invention the regulator 52 is connected by a pipe 53 to the outlet flue 15 leaving the flash chamber, and by another pipe 54 controlled by a valve 55 to the pipe 8 below the minimum desired level in chamber 7. The pipes 53 and 54, which are connected to the chamber 7 above and below the liquid level therein, balance the atmospheric pressure on the liquid column or head in chamber 7, leaving only the pressure created by the head of said liquid above the regulator 52. The regulator 52 regulates the supply of compressed air through a pipe 56 to an air motor or diaphragm 57, that operates a valve 58. The valve 58 is connected in series in a pipe 59 that is connected in parallel or shunt across the valve 12 in the liquid inlet line or pipe 11. This shunt pipe 59 has, in series therein, but on opposite sides of the valve 58, two valves 60 and 61 which are manually operated so that the shunt pipe 59 can be manually cut off or closed. The chamber 7 may have an observation glass 65 by which the liquid in the bottom of the separator may be observed.

In the operation of the illustrated embodiment of the invention, let it be assumed that all valves are closed and the apparatus idle. The oil separator 28 is first filled to the desired level with water by opening the valve 35, which admits water from the source 34 to pipe 27 and thus into the separator. The valve 30 is opened and when the water overflows into the flash chamber 7, the water supply valve 35 is closed. The ejector 24 is next placed in operation by opening valve 26a, which causes a partial vacuum to form in the lower header 18 of the condenser, which is transmitted through pipes 19 to upper header 16, pipe 15 and the flash chamber 7. The valve 22 is opened to pass cooling water through the condenser chamber 20, and the valve 12 is opened to pass juices into the apparatus through pipe 11 to the lower header 5 of the steam chest 1.

The liquid level will rise in the pipes 3, and also pass through the pipe 10 and pump 9 into the pipe 8 where it rises. As soon as the juice level becomes visible in the chamber 7 by observation through the window 65, the pump 9 is started in operation. This will cause the liquid level in chamber 7 to disappear, and the liquid will be passed upwardly through the pipes 3 into the header 4, and then by pipe 6 will be discharged into the flash chamber 7' The steam valve 42 is also opened, and, after a few minutes' start, the condensate pump 44 is started to remove such condensate as may have collected in the chamber 2 of the steam chest. The inlet valve 12 should now be closed completely and valves 60 and 61 opened, and the automatic regulator 52 will take over the flow of juice to the apparatus.

As soon as an oil film in the separator 28 is visible through the window 40, one knows that the operation has begun. At this time the valve 14 can be opened and the withdrawal of treated juices through the pipe 13 begun. The liquid level controller 52 is responsive to the liquid level in the bottom part of the flash chamber 7, and it will automatically control the admission of juice through the pipe 11 at a rate which will maintain a liquid level at or below the opening from pipe 29 into the chamber 7. This regulator, which responds to fluctuations in the pressure created by the head of liquid in chamber 7, controls admission of air through the pipe 56 to the air motor or diaphragm 57 and thus controls the flow of juices into the evaporator to just that amount which will maintain the desired level in chamber 7. The thermometer 49 indicates the temperature of the liquid leaving the flash chamber, and the thermometer 50 indicates the temperature of the liquid which is discharged into the flash chamber 7.

The operator can observe at all times whether or not the machine is functioning properly. For instance the citrus fruit juices may be supplied at a constant speed of about 60 gallons per minute (G. P. M.) at a temperature of about 70° F. The temperature of the juice in the apparatus, as indicated by the thermometer 49, is preferably about 125° F. For this purpose a vacuum of about 26 inches of mercury is maintained in the evaporator by setting the valve 22 in a proper position. The temperature shown by the thermometer 50, will be substantially higher. The rate of evaporation, which corresponds to the difference in temperature between the thermometers 49 and 50, is regulated by operation of the steam valve 42. If more evaporation is desired, more steam is admitted. This would mean that more cooling liquid would have to be admitted through the condenser, and for that valve 22 would be opened further so as to maintain the same vacuum of about 26 inches which would be indicated by a temperature of about 125° F. at the thermometer 49. The 60 G. P. M. or approximately 525 lbs. per minute of fresh juice first of all must be heated from 70 to 125° F., which requires approximately 29 lbs. of steam per minute. When desiring to evaporate 3% of the juice or 15.75 lbs. per minute, an additional amount of about 16 lbs. of steam or a total of about 45 lbs. of steam per minute will be required.

With cooling water entering the condenser at 85° F. and leaving at about 110° F., it will require in the neighborhood of 80 gallons of water per minute to condense the 16 lbs. of vapors entering the condenser. For each 1% of evaporation there will be an evaporation of about 5.25 lbs. per minute, 5.33 lbs. of steam per minute will be required exclusive of heating, and 26.75 G. P. M. cooling water.

The temperature rise of the juice, in passing thru the tubes 3, is determined by the amount of juice circulated by the pump 9. For instance, with a circulation of 300 G. P. M. or 2625 lbs. per minute including the fresh juice, a temperature rise of 2° F. will cause an evaporation of about 5.25 lbs. per hour or 1% of the 60 G. P. M. of fresh juice.

It is not desirable for the juice to start boiling in the tubes. For this reason the pipe 6 purposely is constructed with a vertical section to maintain a head of liquid on the tubes and confine evaporation as much as possible to the space between the outlet of the pipe 6 and the baffle 51.

The following table is an example of what takes place by regulating the flow of steam to the chamber 2 of the steam chest 1.

| When Evaporating, Percent | Temp. Rise | Steam Used Per Minute, Pounds | Water, Gal. P. M. |
|---|---|---|---|
| 1 | 2 | 34 | 27 |
| 2 | 4 | 39.5 | 53.5 |
| 3 | 6 | 45 | 80 |
| 4 | 8 | 50 | 107 |
| 6 | 12 | 60.5 | 160.5 |

These conditions will remain constant as long as the feed temperature is constant and the amount discharged from the apparatus through pipe 13 is kept constant. A variation in the discharge will change these operating conditions. If the withdrawal through pipe 13 is stopped or materially curtailed, the flow of juices to the apparatus is automatically decreased by the liquid level control 52, and with less juice entering through the pipe 11, less heating has to be done, and all of the heat in the steam chest 1 will be used for evaporation only. This would immediately cause an increase in the difference between the indications of the thermometers 49 and 50, and would begin to reduce the vacuum in the flash chamber 7. An experienced operator will immediately know what has taken place, and he can adjust the operating conditions to normal, by reducing the steam flow to the evaporator through closing valve 42 to the desired extent, or by increasing the flow of water through the condenser such as by opening valve 22 to a further extent.

The increase of evaporation that may take place during this period of time has no effect on the product, because all of the water is returned to the original juice from which it is taken, and no harm will result if the machine operated under this condition for several minutes. If the withdrawal of treated juices is to be curtailed only for a few minutes, the machine can coast along under this temporary operating condition, and when the withdrawal of treated juices again increases or returns to normal, the flow of steam to valve 42 can be increased, and the water admitted to the condenser 20 again regulated. Of course automatic regulation of valves 42 and 22 can be provided, if desired.

In the case of a full shut-down, the operator immediately turns off the steam valve 42, and lets the machine run for about five minutes without making any further changes. The discharge valve 14 and valves 60 and 61 are closed, and the circulating pump 9 keeps the juice in constant circulation so as to help remove the heat that is in the apparatus through elimination by the evaporation in the flash chamber 7, and prevent any coating of the tubes which would occur if the juice in the tubes was stagnant. When the evaporation is considerably reduced in this manner, the vacuum again rises and the liquid is cooled to approximately 100° F. When this condition is obtained, the vacuum is broken by opening valve 48, the valve 26a controlling the ejector 24 closed, and the entire contents of the machine can then be discharged by opening the valve 14 which drains out all of the juice that is in the apparatus.

In accordance with this invention the operation can be successfully performed with only about 26 inches of vacuum or 125° F., while heretofore a much higher vacuum has been generally considered necessary to obtain suitable operating conditions. Under this invention the air or gases and the oils are removed from the juices in the same evaporating operation, and at this temperature of about 125° F., a relatively small size of surface condenser 17 can be employed, and commonly available cooling water at 80–90° F. can be used. The juice leaving this apparatus in pipe 13 is usually conveyed by a pump 66 to the sterilizer.

It will be understood, of course, that operation under a higher vacuum is possible if desired for any reason. The separator 28 should have a size sufficient to enable the oil to separate well, and where the rate of evaporation is about 4%, for each 2½ gallons per minute of evaporation the capacity of the separator 28 should be about at least 63 gallons. Under such an arrangement, the time required to move the condensate is 63 divided by 2½, or approximately twenty-five minutes, which has been found ample to obtain substantially complete separation of the oil from the other products of condensation.

In a unit constructed in accordance with this invention, successful results were obtained where the average operating conditions included a 26 inch vacuum in the flash chamber 7, a temperature of 125° F. at thermometer 49, a 10 inch vacuum around the tubes in the steam chest 1, and a 6° temperature increase in the juice passing through the tubes 3. Under such conditions the amount of oil in the juice was reduced from .03% to less than .010%. Government specifications call for less than .015% of oil. Composite samples, when analyzed, indicated that the oil was reduced from .031% to .0085% which corresponds to a removal of about 73% of the oil without loss of either citric acid or ascorbic acid. It was found not necessary to remove the oil continuously from the separator 28, because the amount was comparatively small, and that at the end of a day's run, the separator could be drained, and the oil collected separately.

Where the operation is to be entirely automatic, a temperature controller at the thermometer 49 would be used to control the water flow to the condenser 17 through pipe 21 and maintain a uniform vacuum, and another temperature controller at the thermometer 50 would control the flow of steam to the steam chest through pipe 41 in order to maintain a definite temperature increase in the juice, and a definite rate of evaporation. Even if the percentage of evaporation changes with changes in the amount of juice charged and discharged, this has no objectionable effect on the juice itself, since all of the condensate, except the oil, is returned to the juice from which it was taken.

Fruit juices treated in this manner retain their normal natural flavor and condition exceedingly well, because most of the oil, and the gases such as air, which are in the juices, particularly where the juices are obtained by pressing of the fruit, are removed. Some of the constituents of juices, which give the juice its characteristic or aromatic flavor, and which are generally considered to be esters and will be so referred to herein for lack of a better term, flash off with the oils and water vapor, but most of them appear to be condensed and pass into the separator 28 where they are returned to the juice through the pipe 29 with the water of condensation. This returns to the juices those esters or aromatic constituents that give the juices their "bouquet" or natural characteristics and flavor that would otherwise be lost, and the resulting final product has a remarkable naturalness in flavor and composition and is very close to normal, without those undesirable constituents such as air and oils that cause many undesirable changes in the juices when they are stored or canned.

Some evaporation of moisture in the partial vacuum appears to aid materially in carrying off the air or other gases in the juices and in removing the oils, but ordinarily more than 5% of evaporation is unnecessary in order to obtain adequate removal of the gases and oils from orange juice containing approximately .05% of oil. By changing the character of the stream of liquid discharged into the flash chamber 7 in a manner to increase to a maximum the surface area of the liquid which is exposed to the atmosphere of chamber 7, such as into a thin sheet or stream by discharging it against the plate 51, the air or gases and the oils can be more effectively released from the juices. Other means for increasing the surface area of the liquid of the stream which enters the flash chamber 7 may be employed.

The invention has been described in connection with the treatment of citrus fruit juices, but it will be understood that the invention is also applicable to the treatment of other liquids where similar problems are encountered. It will also be understood that various other changes in steps, details, materials and arrangements of parts, which have been herein described and illustrated in order to explain the nature of the invention, may be made by those skilled in the art within the principle and scope of the invention as expressed in the appended claims.

I claim:

1. The method of removing gases and oils from citrus fruit juices which comprises circulating the juices repeatedly through a chamber having a partial vacuum atmosphere while at a temperature that will cause boiling under said vacuum, collecting and condensing separately from the boiling juices the vapors released into said partial vacuum, removing and discarding the uncondensed gas from said condensation, separating the condensed citrus oils from the condensation, returning the remainder of the condensation to the juices from which the vapors were released, continuously adding fresh juice to the circulating juice at one zone of the circulation, and continuously removing a portion of the juice leaving said chamber before fresh juice is added thereto as the final product.

2. The method of removing gases and oils from citrus fruit juices which comprises forcibly circulating the juices as a stream in a closed loop path, admitting fresh juice to said stream at one zone, removing juice from said stream at another zone, evaporating a portion of said stream in a partial vacuum at a third zone through which the juices pass from said one zone to said another zone, removing the vapors evaporated and released in said third zone, condensing the removed vapors separately from said stream, removing the condensed oils from the condensed vapors and returning the balance of the condensed vapors to said stream between said third zone and said another zone.

3. The method of removing gases and oils from citrus fruit juices which comprises forcibly circulating the juices as a stream in a closed loop path, admitting fresh juice to said stream at one zone, removing juice from said stream at another zone, evaporating a portion of said stream in a partial vacuum at a third zone through which the juices pass from said one zone to said another zone, removing the vapors evaporated and released in said third zone, condensing the removed vapors separately from said stream, returning to said stream at least a portion of the water component of said condensation and only those components soluble therein, and discarding the components of the vapors and condensation thereof that are insoluble in said water of condensation.

4. The method of removing gases and oils from citrus fruit juices in a single operation which comprises circulating a quantity of said juices as a main stream moving in an endless, closed loop path, heating said juices in said stream to a temperature at which they will flash when exposed under a partial vacuum, flashing the heated juices under a partial vacuum, to vaporize entrained gases, oily constituents and some water, continuously adding fresh juice to said main stream before it is flashed, removing a portion only of the juices from said stream after flashing and before fresh juice is added, collecting vapors from said flashing and condensing their condensible portions separately from the main stream, discarding the uncondensed gases from said condensation, separating the oil from the water in such condensation, and returning the remainder of said condensation so separated from the oil, to the main stream.

5. The method of continuously removing oils and gases from a flowing stream of citrus juices which comprises maintaining forced circulation of said juices in a main stream moving in an endless, closed loop path, heating said juices in said main stream, flashing said heated juices under vacuum to vaporize oily constituents and some water therefrom, passing the vapors so produced in a separate stream, condensing said vapors in said separate stream, separating the oily constituents from the condensed vapors, returning to said main stream before it is heated, the aqueous condensed vapors from which the oil has been separated, adding fresh juices to said main stream just before said heating of said main stream and withdrawing treated juices, at substantially the rate of said feeding, from said main stream following said flashing under vacuum and before fresh juices are added to the main stream.

MARTIN J. KERMER.

REFERENCES CITED

The following references are of record in the file of this patent:

UNITED STATES PATENTS

| Number | Name | Date |
|---|---|---|
| 1,353,169 | McDermott | Sept. 21, 1920 |
| 1,574,614 | Fish | Feb. 23, 1926 |
| 1,734,534 | Shields | Nov. 5, 1929 |
| 1,846,955 | Dow | Feb. 23, 1932 |
| 2,019,491 | Grindrod | Nov. 5, 1935 |
| 2,104,415 | Davies | Jan. 4, 1938 |
| 2,104,710 | Blanck | Jan. 4, 1938 |
| 2,151,644 | Stephens | Mar. 21, 1939 |
| 2,169,367 | Mills | Aug. 15, 1939 |
| 2,217,261 | Stevens | Oct. 8, 1940 |
| 2,224,984 | Potts et al. | Dec. 17, 1940 |
| 2,382,181 | Standinger et al. | July 15, 1942 |
| 2,319,994 | Ketchum | May 25, 1943 |
| 2,347,339 | Singleton | Apr. 25, 1944 |
| 2,361,295 | Lizeray | Oct. 31, 1944 |
| 2,534,341 | Cross | Dec. 19, 1950 |

OTHER REFERENCES

Journal Amer. Chem. Soc., vol. 43, page 366, 1921.